(12) United States Patent
Machida

(10) Patent No.: US 7,095,159 B2
(45) Date of Patent: Aug. 22, 2006

(54) DEVICES WITH MECHANICAL DRIVERS FOR DISPLACEABLE ELEMENTS

(75) Inventor: Akihiro Machida, Sunnyvale, CA (US)

(73) Assignee: Avago Technologies Sensor IP (Singapore) Pte. Ltd., (SG)

( * ) Notice: Subject to any disclaimer, the term of this patent is extended or adjusted under 35 U.S.C. 154(b) by 137 days.

(21) Appl. No.: 10/879,610

(22) Filed: Jun. 29, 2004

(65) Prior Publication Data
US 2005/0285479 A1   Dec. 29, 2005

(51) Int. Cl.
*H01L 41/08* (2006.01)
(52) U.S. Cl. .............. 310/323.02; 310/328; 310/331
(58) Field of Classification Search ............. 310/128, 310/330–332, 323.02
See application file for complete search history.

(56) References Cited

U.S. PATENT DOCUMENTS

| | | | |
|---|---|---|---|
| 4,560,263 A * | 12/1985 | Katsuma et al. | 396/133 |
| 4,570,096 A | 2/1986 | Hara et al. | |
| 4,841,323 A | 6/1989 | Yamada et al. | |
| 4,910,544 A | 3/1990 | Nomura | |
| 5,049,775 A * | 9/1991 | Smits | 310/328 |
| 5,089,740 A * | 2/1992 | Ono | 310/328 |
| 5,338,997 A * | 8/1994 | Benecke | 310/307 |
| 5,709,802 A * | 1/1998 | Furuhata et al. | 216/2 |
| 5,929,542 A | 7/1999 | Ohnstein et al. | |
| 5,943,189 A | 8/1999 | Boutaghou et al. | |
| 5,965,968 A | 10/1999 | Robert et al. | |
| 6,298,545 B1 | 10/2001 | Mohajerani et al. | |
| 6,380,661 B1 | 4/2002 | Henderson et al. | |
| 6,393,218 B1 | 5/2002 | Iwasaki et al. | |
| 6,437,485 B1 * | 8/2002 | Johansson | 310/332 |
| 6,466,740 B1 | 10/2002 | Yoshida et al. | |
| 6,600,877 B1 | 7/2003 | Shimizu et al. | |
| 6,707,230 B1 | 3/2004 | Smith et al. | |
| 6,717,227 B1 | 4/2004 | Tamura et al. | |
| 6,731,471 B1 | 5/2004 | Bonin | |
| 6,838,808 B1 * | 1/2005 | Tanaka | 310/328 |
| 6,977,461 B1 * | 12/2005 | Hendriks et al. | 310/328 |
| 2003/0032293 A1 | 2/2003 | Kim et al. | |
| 2003/0160872 A1 | 8/2003 | Yeung | |
| 2003/0201416 A1 | 10/2003 | Miles | |
| 2004/0056567 A1 | 3/2004 | Menzel | |

* cited by examiner

*Primary Examiner*—Mark Budd

(57) ABSTRACT

Devices with mechanical drivers for displaceable elements are described. In one aspect, a device includes a displaceable element, a driver, and a controller. The driver includes a plurality of actuatable drive elements. Each drive element has a respective engagement area that is operable to move from a respective start position to a respective end position and back to the start position. During movement from the start position to the end position the engagement area is engaged with the displaceable element and applies a mechanical force urging the displaceable element to move. During movement from the end position to the start position the engagement area is disengaged from the displaceable element. The controller is configured to choreograph the operation of the actuatable drive elements in moving the displaceable element.

17 Claims, 6 Drawing Sheets

DEVICES WITH MECHANICAL DRIVERS FOR DISPLACEABLE ELEMENTS

BACKGROUND

Mechanical drivers (or motors) are used in a wide variety of different applications ranging from optics, microscopy, robotics, and analytical instruments. In many of these applications, it is desirable for the mechanical driver to be small in size and light in weight, while being operable to move and position one or more components within a device with moderate speed and high precision.

Semiconductor fabrication technology is being used to develop devices that include mechanical drivers that are formed with micro-electro-mechanical systems (MEMS) that have micron-scale features. Various MEMS-based devices, such as actuators, acoustic devices, filters, resonators and sensors, are formed of active materials that change in size or shape in response to applied energy, which may be in the form of an electrical field, a magnetic field, an electromagnetic field, or thermal energy. Induced strain actuators (or morphs) bend as a result of internal moments that are induced by the applied energy. Induced strain actuators convert induced strains into moments that cause the constituent active materials to bend in a controlled way. Induced strain actuators may be formed of, for example, piezoelectric materials, ferroelectric materials, electrorestrictive materials, magnetorestrictive materials, and thermally expansive materials.

Different types of MEMS-based micro-motor designs have been proposed. Many such micro-motor designs are driven by electrostatic forces. In a typical approach, the micro-motor includes a rotor and a stator. The stator includes electrodes that are placed around the rotor. A voltage differential is applied between a selected group of stator electrodes and the rotor. The voltage differential creates an electric field that rotates the rotor into alignment with the selected group of stator electrodes. The rotor is rotated continuously by powering different sets of stator electrodes in a synchronized way.

In another approach, a linear bi-directional motor is driven by one or more MEMS-based induced strain actuators. These actuators incorporate a plurality of multi-clamps that ride on and alternately engage rails that are located on the base of the motor. The multi-clamps are driven by electrically energized auxiliary actuators. The operation of the multi-clamps is synchronized with the operation of a main actuator that alternately extends and contracts. The coordinated operation the main and auxiliary actuators results in incremental movement of the multi-clamp assembly along the rails.

SUMMARY

In one aspect of the invention, a device includes a displaceable element, a driver, and a controller. The driver includes a plurality of actuatable drive elements. Each drive element has a respective engagement area that is operable to move from a respective start position to a respective end position and back to the start position. During movement from the start position to the end position the engagement area is engaged with the displaceable element and applies a mechanical force urging the displaceable element to move. During movement from the end position to the start position the engagement area is disengaged from the displaceable element. The controller is configured to choreograph the operation of the actuatable drive elements in moving the displaceable element.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments that are described in detail below incorporate novel drivers for moving displaceable elements. These drivers are configured to apply mechanical forces that urge the displaceable elements to move. These embodiments may be implemented at least in part using MEMS technology to provide small, light-weight device components capable of rapid, high-precision movements that operate with relatively low power, making them ideal for incorporation in, for example, consumer electronics applications, such as still image cameras and video cameras.

Figure 1:
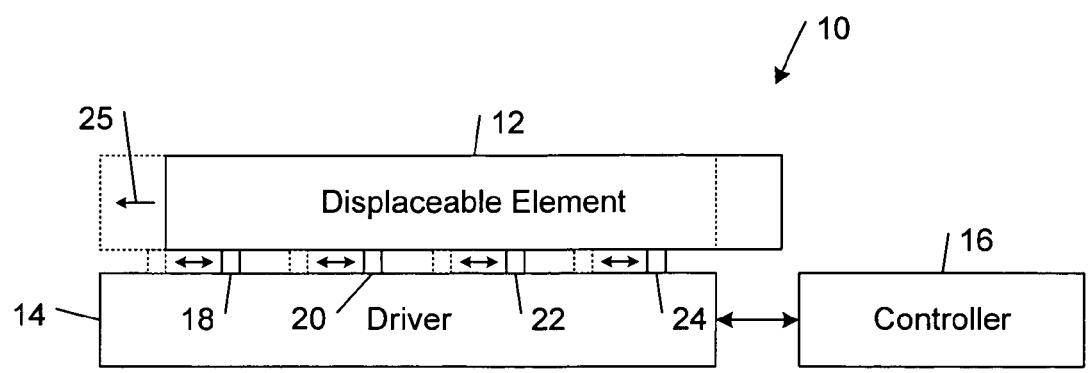
FIG. 1 is a block diagram of an embodiment of a device that includes a displaceable element, a driver, and a controller.

FIG. 1 shows an embodiment of a device 10 that includes a displaceable element 12, a driver 14 for moving the displaceable element 12, and a controller 16.

The displaceable element 12 may be any type of device component capable of being moved in response to mechanical forces that are applied by the driver 14. In some implementations, the displaceable element 12 is configured to move back-and-forth along a linear or curved path in response to the applied driving forces. In other implementation, the displaceable element 12 is configured to rotate about an axis in response to the applied driving forces. In some implementations, the displaceable element 12 includes a cam mechanism that is configured to translate rotational movements into linear movements, or vice versa.

The driver 14 includes a plurality of actuatable drive elements 18, 20, 22, 24. Each drive element 18–24 has a respective engagement area that is operable to move from a respective start position (shown by the solid lines in FIG. 1) to a respective end position (shown by the dashed lines in FIG. 1) and back to the start position. During movement from the start position to the end position, the engagement area of each drive element 18–24 is engaged with the displaceable element 12 and applies a mechanical force urging the displaceable element 12 to move in a direction indicated by arrow 25. During movement from the end position to the start position, on the other hand, the engagement area of each drive element 18–24 is disengaged from the displaceable element 12 and therefore does not apply any motive force to the displaceable element 12. The drive elements 18–24 may then re-engage the displaceable element 12 and re-apply mechanical forces to the displaceable element 12 urging the displaceable element 12 to move in the direction indicated by arrow 25. By moving the drive elements 18–24 from the start position to the end position through multiple cycles, the driver 14 is able to move the displaceable element 12 incrementally in the direction of arrow 25.

Figure 2A:
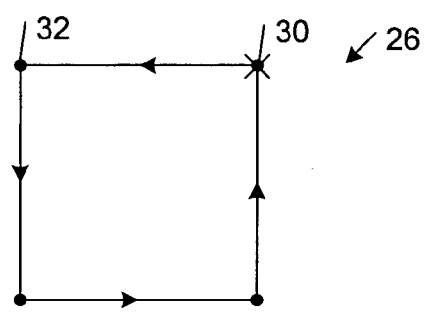
FIG. 2A is a diagrammatic view of the path of an engagement area of an actuatable drive element during operation of an implementation of the device of FIG. 1.
Figure 2B:
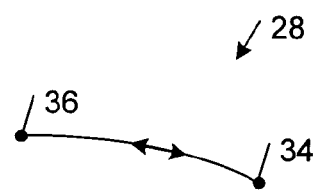
FIG. 2B is a diagrammatic view of the path of an engagement area of an actuatable drive element during operation of an implementation of the device of FIG. 1.

In some embodiments, the engagement area of each drive element 18–24 may move along a closed loop path 26 in a single direction between a start position 30 and an end position 32 (indicated by the arrows), as shown in FIG. 2A. In other embodiments, the engagement area of each drive element 18–24 may move back-and-forth along an open path 28 between a start position 34 and an end position 36 (indicated by the double-headed arrow), as shown in FIG. 2B.

The drive elements 18–24 may be configured to move the displaceable element 12 along a linear or curved path, or they may be configured to rotate the displaceable element 12 about an axis. In some implementations, the drive elements 18–24 are configured to move the displaceable element 12 in a single direction, whereas in other implementations, the drive elements 18–24 are configured to move the displaceable element 12 bi-directionally.

The controller 16 is configured to choreograph the operation of the actuatable drive elements 18–24 in moving the displaceable element 12. In general, the controller 16 is not limited to any particular hardware or software configuration, but rather it may be implemented in any computing or processing environment, including in digital electronic circuitry or in computer hardware, firmware, device driver, or software. In some implementations, the controller 16 may be embedded in the hardware of any one of a wide variety of digital and analog electronic devices, including desktop and workstation computers, digital or analog still image cameras, digital or analog video cameras, printers, scanners, and portable electronic devices (e.g., mobile phones, laptop and notebook computers, and personal digital assistants).

FIGS. 3A–3D are diagrammatic side views of an actuatable drive element 40 in an implementation of the device 10 shown in FIG. 1 at different positions during a cycle of operation. The drive element 40 includes an engagement portion 42 with an engagement surface 44 that is configured to interlock or mesh with engagement features 46 of the displaceable element 12. In the illustrated implementation, the engagement surface 44 is a conical or pyramidal shaped surface that projects into recesses formed between pairs of adjacent teeth constituting the engagement features 46 of the displaceable element 12 during the driving phase of operation. The drive element 40 also includes an anchor portion 48 that is connected to the engagement portion 42 by a beam 50. The anchor portion 48 is retained within a recess 52 that is formed in a base 54 of the driver 14. The beam 50 sits in a linear or curved slot 56 that is formed in the base 54.

For each drive element 40, the driver 14 includes an associated clutch mechanism 58 and an associated drive mechanism 60. The clutch mechanism 58 is configured to selectively bring the engagement area 44 into and out of engagement with the engagement features 46 of the displaceable element 12. The drive mechanism 60 is configured to urge the engagement area 44 to shift laterally in a first direction (indicated by arrow 62) during movement of the engagement area 44 from the start position to the end position. The drive mechanism 60 also is configured to urge the engagement area 44 to shift laterally in a second direction (e.g., opposite the first direction indicated by arrow 62) during movement of the engagement area 44 from the end position to the start position.

The clutch mechanism 58 includes one or more active material actuators 64 that define the slot 56 through which the beam 50 of the drive element 40 extends. Each active material actuator 64 is configured to respond to signals received from the controller 16 by moving the drive element 44 up and down in longitudinal directions (indicated by double-headed arrow 66). In general, the active material actuators 64 may be any type of actuator that is capable of moving the drive element 44 into and out of engagement with the engagement features 46 of the displaceable element 12. In the illustrated embodiment, the active material actuators 64 are implemented by induced strain (or morph) actuators that bend in response to internal strains that are induced by a signal received from the controller 16. The active material actuators 64 are shown in a relaxed (unbent) state in FIGS. 3A and 3B, and are shown in a strained (bent) state in FIGS. 3C and 3D. The actuators 64 may be formed of, for example, one or more active materials selected from a piezoelectric material, a ferroelectric material, an electrorestrictive material, a magnetorestrictive material, and a thermally expansive material. In one exemplary implementation, the clutch actuators 64 are implemented by the piezoelectric bimorph actuators described in detail below in connection with FIGS. 7A and 7B.

In the illustrated embodiment, the drive mechanism 60 includes a pair of stacked electrically conductive coil structures 68, 70 that are configured to generate magnetic fields with polarities that depend on the direction of current flowing through the coil structures 68, 70. The top-to-bottom polarities of the magnetic fields generated by coil structures 68, 70 are S-to-N in FIGS. 3A and 3B, whereas the top-to-bottom polarities of the magnetic fields generated by coil structures 68, 70 are N-to-S in FIGS. 3C and 3D. In this embodiment, the actuatable drive element 40 is formed of a magnetizable material. In one implementation, the drive element 40 is a shaped (or molded) permanent magnet that exhibits a magnetic field with a fixed polarity. In this embodiment, the drive element 40 may slide back-and-forth in slot 56, but it cannot rotate in slot 56 so that the orientation of its magnetic polarization axis remains substantially fixed with respect to the coil structures 68, 70. In operation, the controller 16 is configured to power the coil structures 68, 70 to generate magnetic fields that cooperatively urge the drive element 40 to shift laterally in the first direction 62 or the second direction.

In other embodiments, the drive mechanism 60 may include one or more structures that are configured to generate in response to a signal received from the controller 16 a field urging the associated drive element 40 to shift laterally. For example, the drive element 40 may be formed of an electrically charged material (e.g., an electret) and the drive mechanism 60 may include a pair of electrodes that are configured to generate an electrostatic field that selectively attracts the drive element 40 in the first and second lateral directions.

Figure 3A:
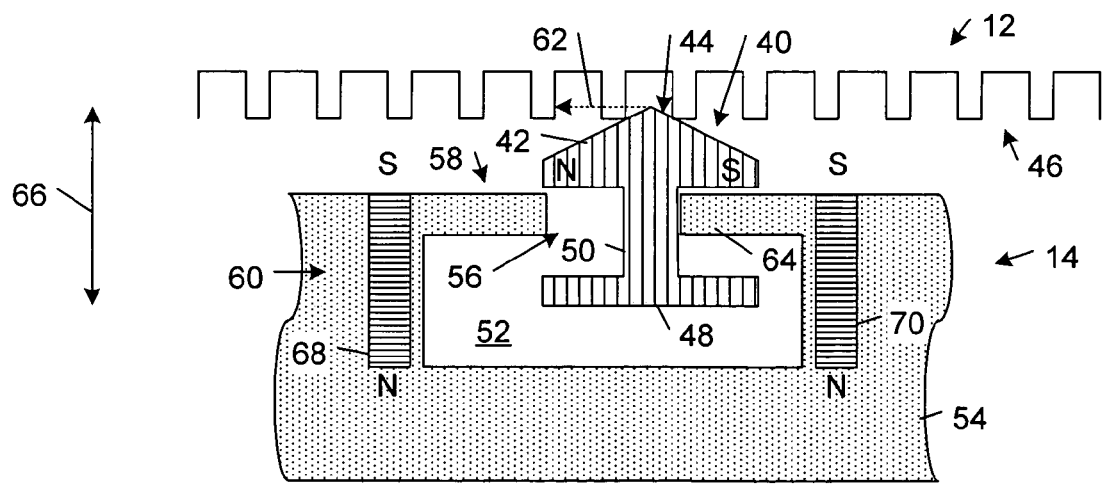
FIGS. 3A–3D are diagrammatic side views of an actuatable drive element in an implementation of the device of FIG. 1 at different positions during a cycle of operation.
Figure 3B:
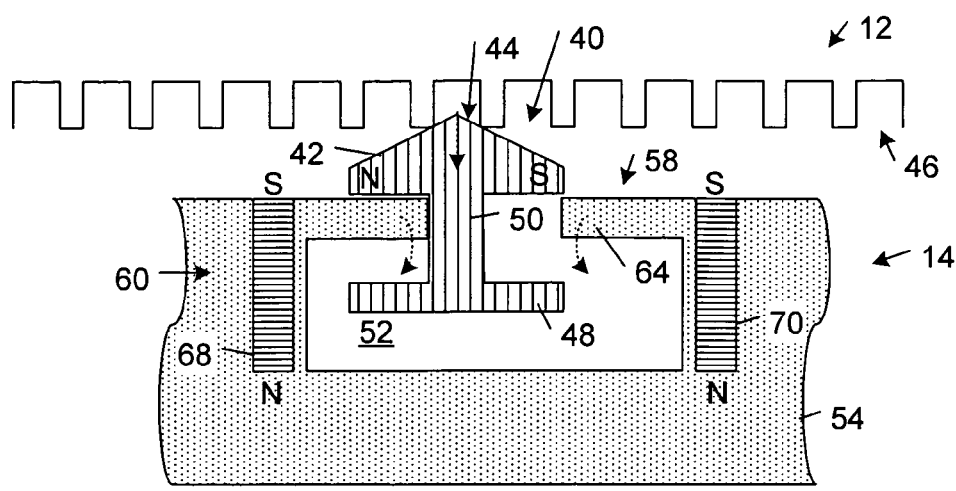
Figure 3C:
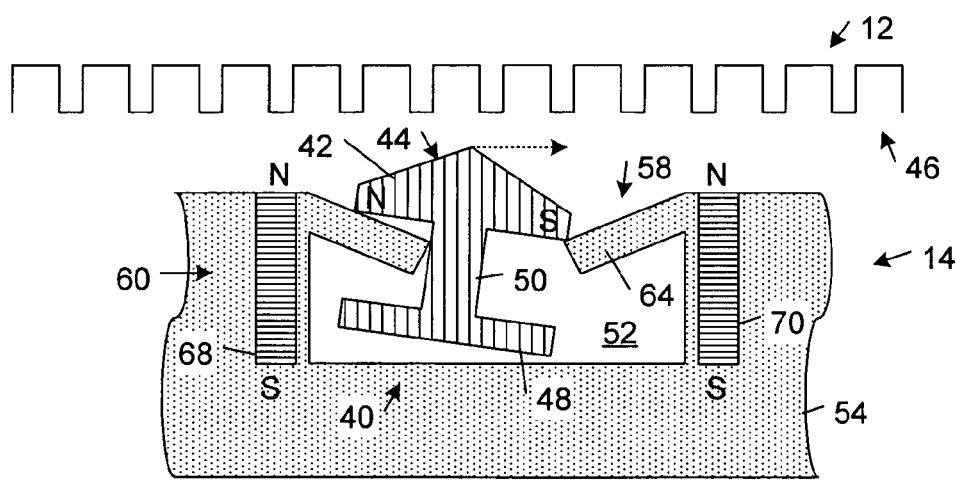
Figure 3D:
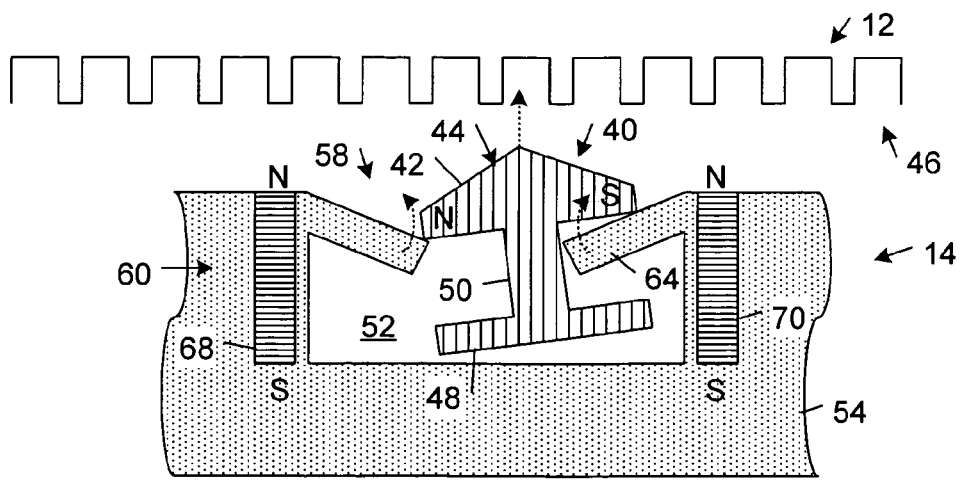
Figure 4:
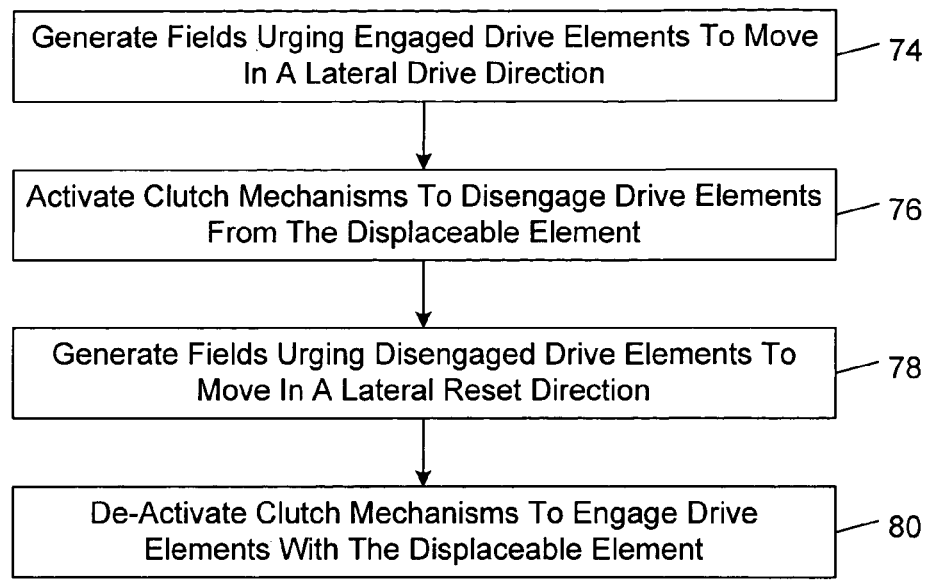
FIG. 4 is a flow diagram of an embodiment of a method of operating the implementation of the device shown in FIGS. 3A–3D.

FIG. 4 shows an embodiment of a method of operating the implementation of driver 14 shown in FIGS. 3A–3D. A drive phase of operation begins with the engagement surfaces 44 of drive elements 40 in their respective start positions and engaged with the engagement features 46 of the displaceable element 12, as shown in FIG. 3A. During the drive phase, the controller 16 powers the drive mechanisms 60 to generate fields urging the engaged drive elements 40 to move laterally in the first (or drive) direction 62 (block 74). At the end of the drive phase (shown in FIG. 3B), the controller 16 activates the clutch mechanisms 58 to disengage the drive elements 40 from the displaceable element 12, as shown in FIG. 3C (block 76). During the reset phase, the controller 16 powers the drive mechanisms 60 to generate fields urging the engaged drive elements 40 to move laterally in the second (or reset) direction (opposite direction 62) (block 78). At the end of the reset phase (shown in FIG. 3D), the controller 16 de-activates the clutch mechanisms 58 to re-engage the drive elements 40 with the engagement features 44 of the displaceable element 12 (block 80), thereby completing one cycle of operation.

The controller 16 may repeat the operation cycle shown in FIGS. 3A–3D multiple times until the displaceable element 12 has moved by a desired amount. The controller 16 also may redefine the start and end positions, and reverse the directions of the fields generated by the drive mechanisms 60 in order reverse the drive and reset directions of movement for the drive elements 40. In this way, the displaceable element 12 may be moved in a direction opposite the drive direction 62.

Figures 5A, 5B:
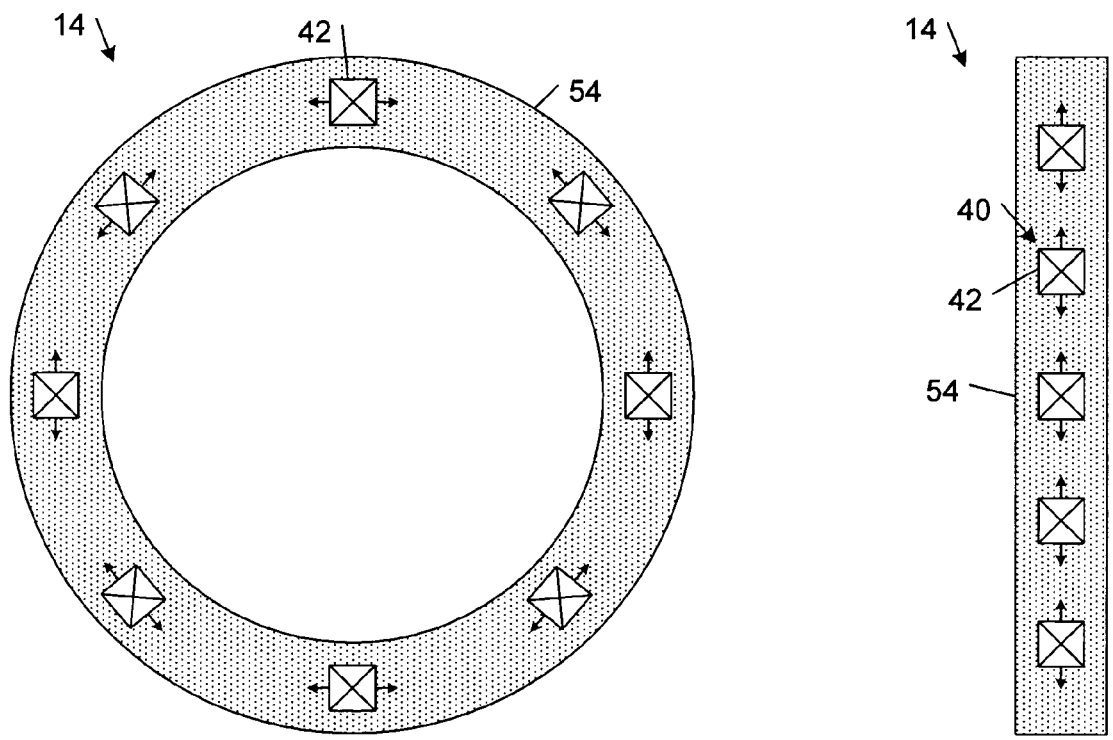
FIG. 5A is a diagrammatic top view of an implementation of the device of FIG. 1 in which the driver is configured to rotate the displaceable element.
FIG. 5B is a diagrammatic top view of an implementation of the device of FIG. 1 in which the driver is configured to move the displaceable element along a linear path.

FIG. 5A shows an exemplary implementation of driver 14 in which the actuatable drive elements 40 are arranged along a circular path in base 54 and are configured to rotate the displaceable element 12 unidirectionally or bidirectionally about an axis. FIG. 5B shows an alternative implementation of driver 14 in which the actuatable drive elements 40 are arranged along a linear path in base 54 and are configured to move the displaceable element 12 back-and-forth linearly.

Figure 6A:
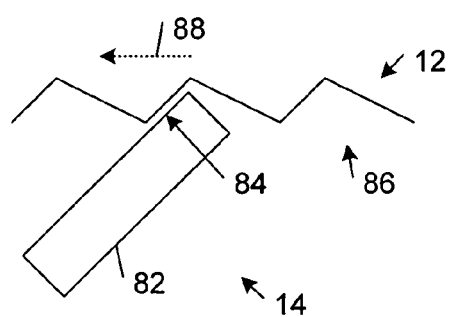
FIG. 6A is a diagrammatic top view of an actuatable drive element with an engagement area at a start position in an implementation of the device of FIG. 1.
Figure 6B:
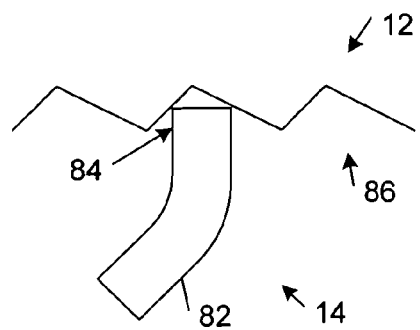
FIG. 6B is a diagrammatic top view of the actuatable drive element shown in FIG. 6A actuated such that the engagement area at an end position.

FIGS. 6A and 6B are diagrammatic top views of an actuatable drive element 82 in an implementation of the device 10 shown in FIG. 1 at different positions during a cycle of operation. The drive element 82 includes an engagement surface 84 that is configured to interlock or mesh with engagement features 86 of the displaceable element 12. In the illustrated implementation, the engagement surface 84 is a rectangular surface that projects into recesses formed between pairs of adjacent sawtooth teeth constituting the engagement features 86 of the displaceable element 12 during the driving phase of operation.

The drive element 82 is implemented by an active material actuator that is configured to respond to signals received from the controller 16 by moving the displaceable element 12 laterally in the direction indicated by arrow 88. In the illustrated embodiment, the drive element 82 is implemented by an induced strain (or morph) actuator that bends in response to internal strains induced by a signal received from the controller. The drive element 82 is shown in a relaxed (unbent) state in FIG. 6A, and is shown in a strained (bent) state in FIG. 6B. The drive element 82 may be formed of, for example, one or more active materials selected from a piezoelectric material, a ferroelectric material, an electrorestrictive material, a magnetorestrictive material, and a thermally expansive material.

Figure 7A:
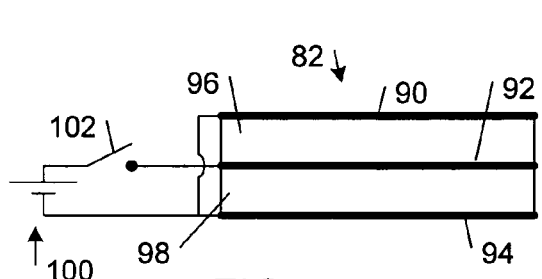
FIG. 7A is a diagrammatic side view of an implementation of the actuatable drive element shown in FIGS. 6A and 6B in an un-actuated state.
Figure 7B:
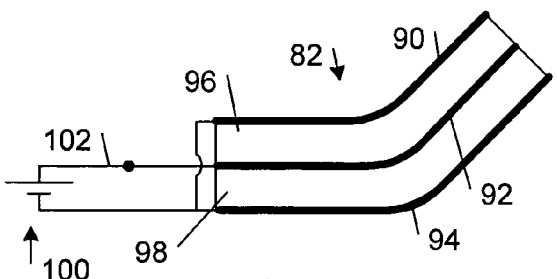
FIG. 7B is a diagrammatic side view of an implementation of the actuatable drive element shown in FIGS. 6A and 6B in an actuated state.

In one exemplary implementation, the drive element 82 is implemented by the piezoelectric bimorph actuators shown in FIGS. 7A and 7B. In this implementation, the drive element 82 includes three electrodes 90, 92, 94 separated by piezoelectric material layers 96, 98. The electrodes 90, 94 are connected electrically to a first terminal of a voltage generator 100 and the electrode 92 is connected to a second terminal of the voltage generator 100 through a switch 102. During the unbent phase of operation, the switch 102 is open (FIG. 7A), and therefore no electric fields are applied across the piezoelectric layers 96, 98. During the bent phase of operation, the switch 102 is closed (FIG. 7B), and therefore electric fields are applied across the piezoelectric layers 96, 98 that induce internal strains that are converted into moments, which cause the drive element 82 to bend.

During a drive phase of operation, the controller 16 activates the drive element 82, which urges the displaceable element to move in the direction of arrow 88. During a reset phase of operation, the controller 16 de-activates the drive element 82. In response, the drive element 82 reverts back to its unbent state. The engagement features 86 of displaceable element 12 are configured to that the drive element 82 can move into a start position with respect to the next sawtooth engagement feature 86, whereby the drive element 86 is positioned to begin the drive phase of operation with respect to that engagement feature 86. The controller 16 may selectively cycle the drive elements 82 through bent and unbent phases of operation and thereby cause the displaceable element 12 to move in the bend direction 88.

Figure 8:
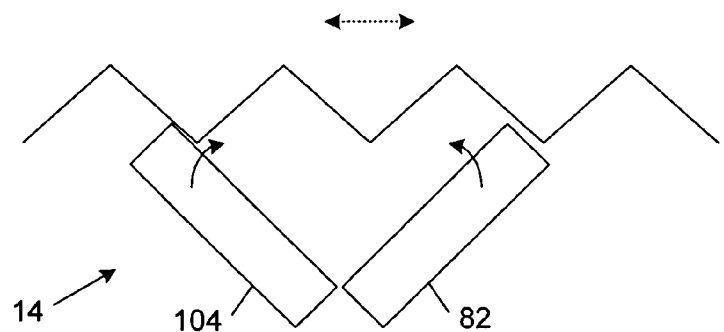
FIG. 8 is a diagrammatic top view of a pair of actuatable drive elements with respective engagement areas in un-actuated states in an implementation of the device of FIG. 1.

As shown in FIG. 8, the driver 14 may include two drive elements 82 104 that are configured to move the displaceable element 12 in opposite directions (indicated by the double-headed arrow). The driver 14 may include multiple pairs of drive elements 82, 104 and the controller 16 may be configured to selectively power one drive element of each pair to move the displaceable element 12 in a first direction. The controller 16 may selectively power the other drive element of each pair to move the displaceable element 12 in a direction opposite the first direction.

Figure 9:
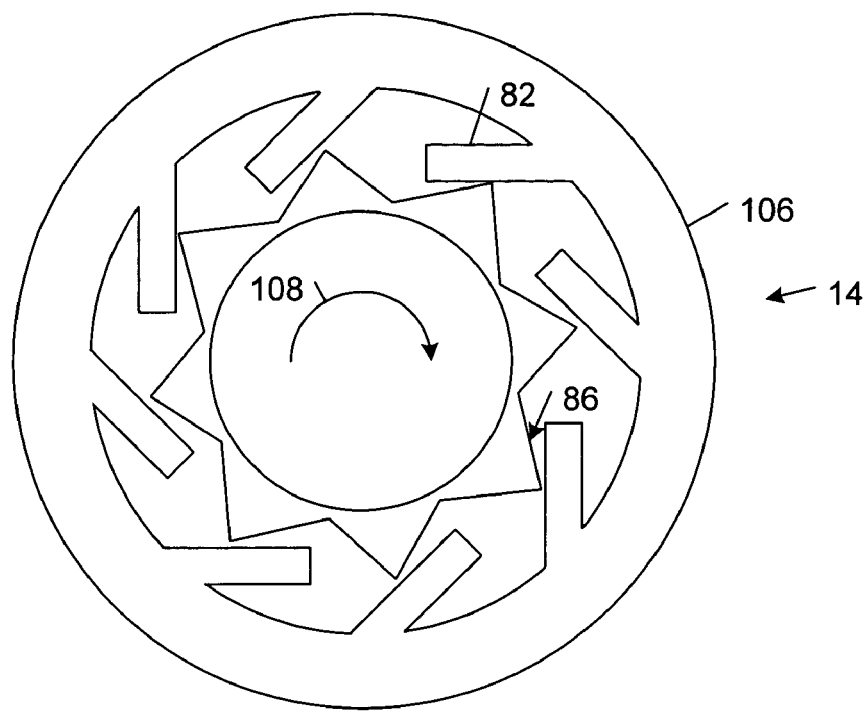
FIG. 9 is a diagrammatic top view of an implementation of the device of FIG. 1 in which the driver is configured to rotate the displaceable element.

FIG. 9 shows a top view of an implementation of the device of FIG. 1 in which the driver 14 is configured to rotate the displaceable element 12. In this implementation, the actuatable drive elements 82 are arranged along a circular path in a base 106 and are configured to engage the engagement features 86 and rotate the displaceable element 12 about an axis in the direction indicated by arrow 108. In an alternative implementation of driver 14, the actuatable drive elements 82 are arranged along a linear path in a base and are configured to move the displaceable element 12 in a linear direction.

Figure 10:
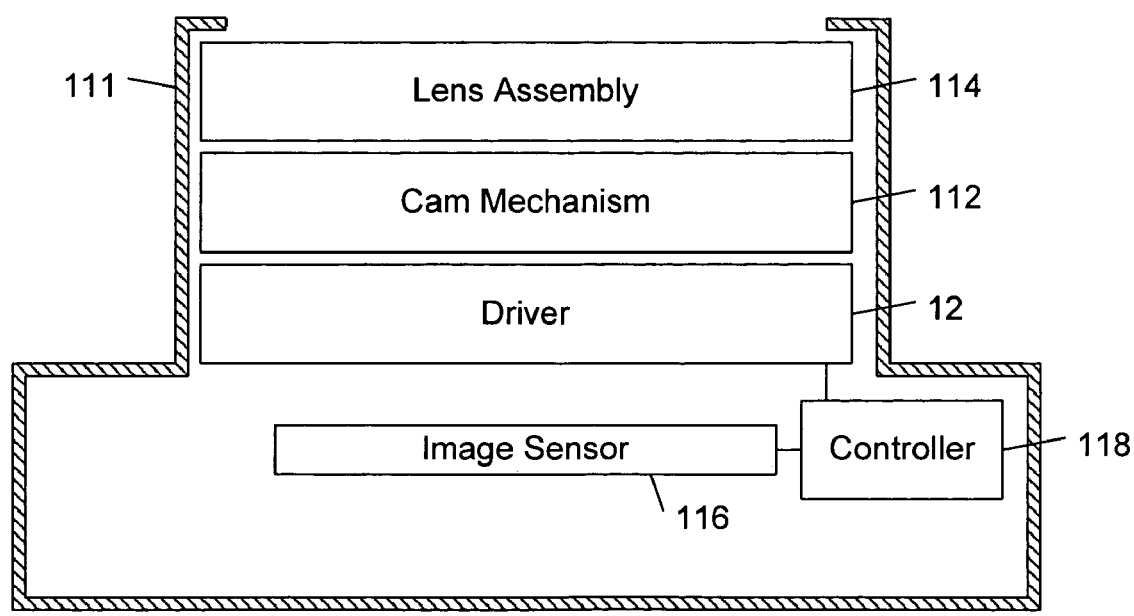
FIG. 10 is a block diagram of a camera incorporating an implementation of the device shown in FIG. 1.

FIG. 10 shows an embodiment of a camera 110 that incorporates implementation of the components of the device 10. The camera 110 includes a camera body 111 that contains an implementation of driver 14, an implementation of the displaceable element 12 in the form of a cam mechanism 112, a lens assembly 114, an image sensor 116, and a controller 118. The camera 110 may be a digital or analog still image camera or a digital or analog video camera. The image sensor 118 may be any type of image sensor, including a CMOS image sensor available from Agilent Technologies, Inc. of Palo Alto, Calif., USA. The driver 14 may correspond to an implementation of any of the driver embodiments described above that is configured to rotate the displaceable element 12 about an axis.

Figure 11:
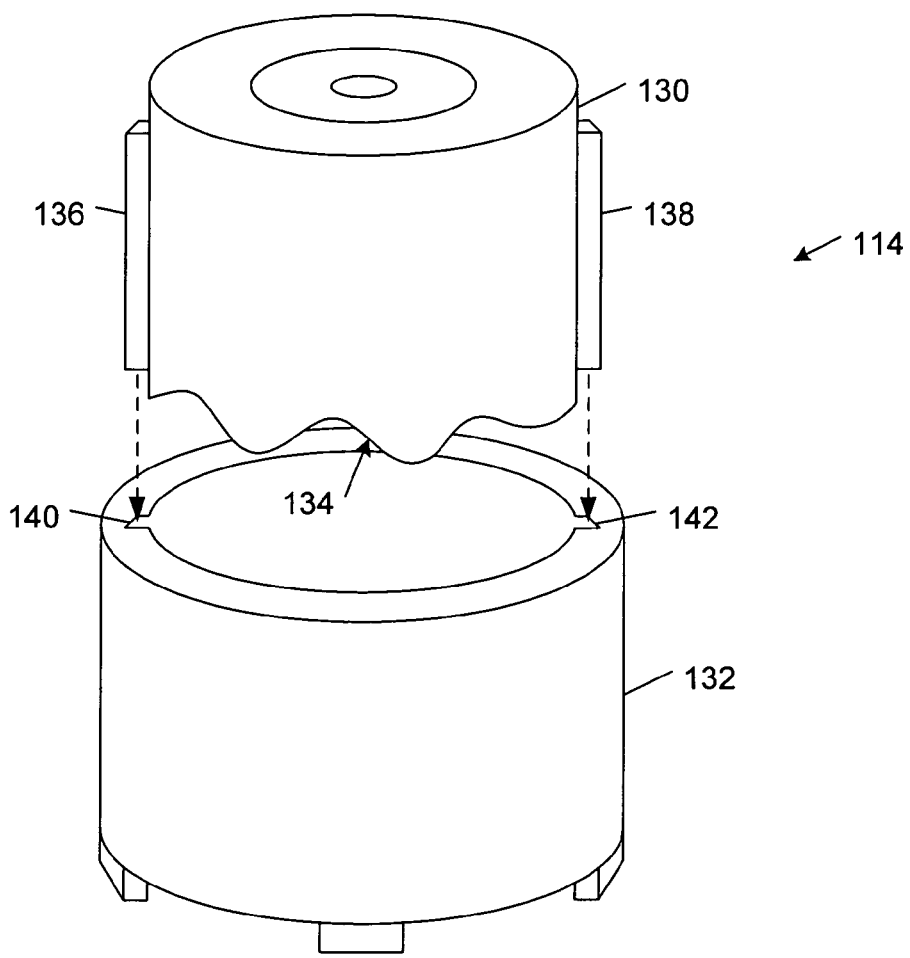
FIG. 11 is a diagrammatic view of an implementation of the lens assembly of the camera shown in FIG. 10.

FIG. 11 shows an implementation of the lens assembly 114 that includes a lens 130 and a lens body 132. The lens 130 includes an undulating engagement surface 134 that is configured to mate with the engagement areas of the drive elements in driver 14. The lens 130 also includes a pair of rails 136, 138 that slide into a pair of slots 140, 142 that are formed in the lens body 132. The rails 136, 138 and slots 140, 142 prevent the lens 130 from rotating relative to the lens body 132, which is fixedly attached to the camera body 111. The lens 130 is operable to slide within the lens 132 along the rails in an axial direction. In this way, the focus of the lens assembly 114 onto the active area of the image sensor 118 may be adjusted.

Figure 12A:
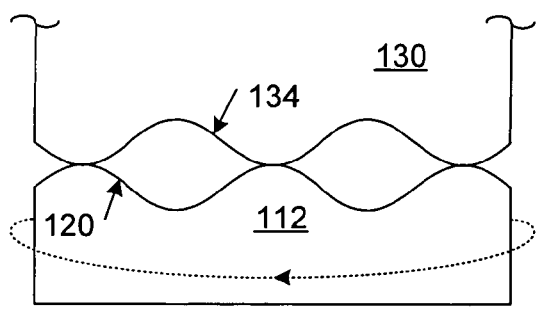
FIGS. 12A and 12B are diagrammatic side views of different operational positions of the cam mechanism and a lens of the lens assembly of FIG. 11 in an implementation of the camera shown in FIG. 10.
Figure 12B:
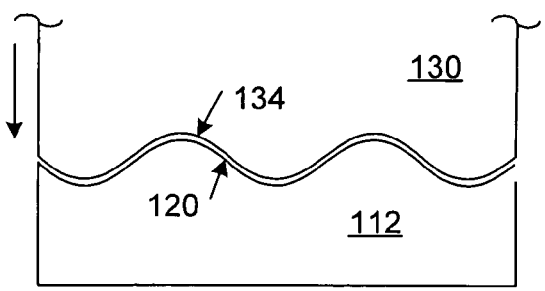

In general, the cam mechanism 112 may be implemented by any type of mechanism that converts rotational movement into a linear movement of the lens 130 within the lens body 132. Referring to FIGS. 12A and 12B, in one implementation, the cam mechanism 112 includes an undulating surface 120 that engages the engagement surface 134 of the lens 130. The distance separating the lens 130 from an active area of the image sensor 118 is controlled by the rotational orientation of the cam mechanism. In an extended position (shown in FIG. 11A), the peaks in the undulating surface 120 are aligned with the engagement surface 134 at the bottom of the lens 130. In a retracted position (shown in FIG. 11A), the troughs in the undulating surface 120 are aligned with the engagement surface 134 at the bottom of the lens 130.

Controller 116 choreographs the operation of the actuatable drive elements in the driver 14 in rotating the cam mechanism 112 to a rotational position that coincides with a desired focal distance between the lens 130 and the active area of the image sensor 118.

Other embodiments are within the scope of the claims.

What is claimed is:

1. A device, comprising:
    a displaceable element;
    a driver comprising a plurality of actuatable drive elements each having a respective engagement area operable to move from a respective start position to a respective end position and back to the start position, wherein during movement from the start position to the end position the engagement area is engaged with the displaceable element and applies a mechanical force urging the displaceable element to move, and during movement from the end position to the start position the engagement area is disengaged from the displaceable element,
    wherein the driver comprises a base comprising a plurality of recesses, each of the recesses having a slotted opening that defines for a respective one of the drive elements extending therethrough a range of lateral movement corresponding to lateral movement of the respective drive element between the start position and the end position; and
    a controller configured to choreograph the operation of the actuatable drive elements in moving the displaceable element.

2. The device of claim 1, wherein the driver comprises for each drive element an associated clutch mechanism configured to selectively bring the engagement area of the associated drive element into and out of engagement with the displaceable element.

3. The device of claim 2, wherein each clutch mechanism comprises an active material actuator responsive to signals received from the controller and configured to mechanically urge the associated drive element to move.

4. The device of claim 3, wherein each active material actuator comprises a morph element that bends in response to internal strains induced by a signal received from the controller.

5. The device of claim 4, wherein the morph element is a piezoelectric morph element.

6. The device of claim 1, wherein the driver comprises for each drive element a drive mechanism configured to urge the engagement area of an associated drive element to shift laterally in a first direction during movement of the engagement area from the start position to the end position and to shift laterally in a second direction during movement of the engagement area from the end position to the start position.

7. The device of claim 6, wherein each drive mechanism is configured to generate in response to a signal received from the controller a field urging the associated drive element to shift laterally.

8. A device, comprising:
    a displaceable element;
    a driver comprising a plurality of actuatable drive elements each having a respective engagement area operable to move from a respective start position to a respective end position and back to the start position, wherein during movement from the start position to the end position the engagement area is engaged with the displaceable element and applies a mechanical force urging the displaceable element to move, and during movement from the end position to the start position the engagement area is disengaged from the displaceable element,
    wherein the driver comprises for each drive element a drive mechanism configured to urge the engagement area of an associated drive element to shift laterally in a first direction during movement of the engagement area from the start position to the end position and to shift laterally in a second direction during movement of the engagement area from the end position to the start position, wherein each drive element has a magnetic polarization and each drive mechanism is configured to generate a magnetic field urging the associated drive element to shift laterally; and
    a controller configured to choreograph the operation of the actuatable drive elements in moving the displaceable element.

9. The device of claim 1, wherein the driver comprises for each drive element:
- a clutch mechanism configured to selectively urge the engagement area of the associated drive element to shift longitudinally into and out of engagement with the displaceable element; and
- a driver configured to urge the engagement area of an associated drive element to shift laterally in a first direction during movement of the engagement area from the start position to the end position and to shift laterally in a second direction during movement of the engagement area from the end position to the start position.

10. A device, comprising:
- a displaceable element;
- a driver comprising a plurality of actuatable drive elements each having a respective engagement area operable to move from a respective start position to a respective end position and back to the start position, wherein during movement from the start position to the end position the engagement area is engaged with the displaceable element and applies a mechanical force urging the displaceable element to move, and during movement from the end position to the start position the engagement area is disengaged from the displaceable element, wherein the driver comprises for each drive element
- a clutch mechanism configured to selectively urge the engagement area of the associated drive element to shift longitudinally into and out of engagement with the displaceable element, and
- a driver configured to urge the engagement area of an associated drive element to shift laterally in a first direction during movement of the engagement area from the start position to the end position and to shift laterally in a second direction during movement of the engagement area from the end position to the start position, wherein each drive element comprises an engagement portion and a portion retained within a micro-machined cavity formed in the driver, wherein the engagement portion is supported by an active material actuator defining a slot through which a connector portion extends to connect the engagement portion and the retained portion, the connector portion being laterally shiftable within the slot; and
- a controller configured to choreograph the operation of the actuatable drive elements in moving the displaceable element.

11. The device of claim 1, wherein the displaceable element comprises a plurality of engagement elements configured to engage the engagement areas of the drive elements.

12. The device of claim 1, wherein the displaceable element is rotatable and the driver is configured to rotate the displaceable element.

13. The device of claim 12, wherein the displaceable element comprises a cam mechanism for translating rotation motion into linear motion.

14. The device of claim 1, further comprising a lens assembly responsive to movement of the displaceable element.

15. The device of claim 14, further comprising an image sensor.

16. The device of claim 15, wherein movement of the displaceable element changes focus of the lens assembly onto an active area of the image sensor.

17. The device of claim 16, wherein the driver is configured to rotate the displaceable element and the displaceable element comprises a cam mechanism for translating rotational motion into linear motion that changes the focus of the lens assembly onto the active area of the image sensor.

* * * * *